Dec. 11, 1923.

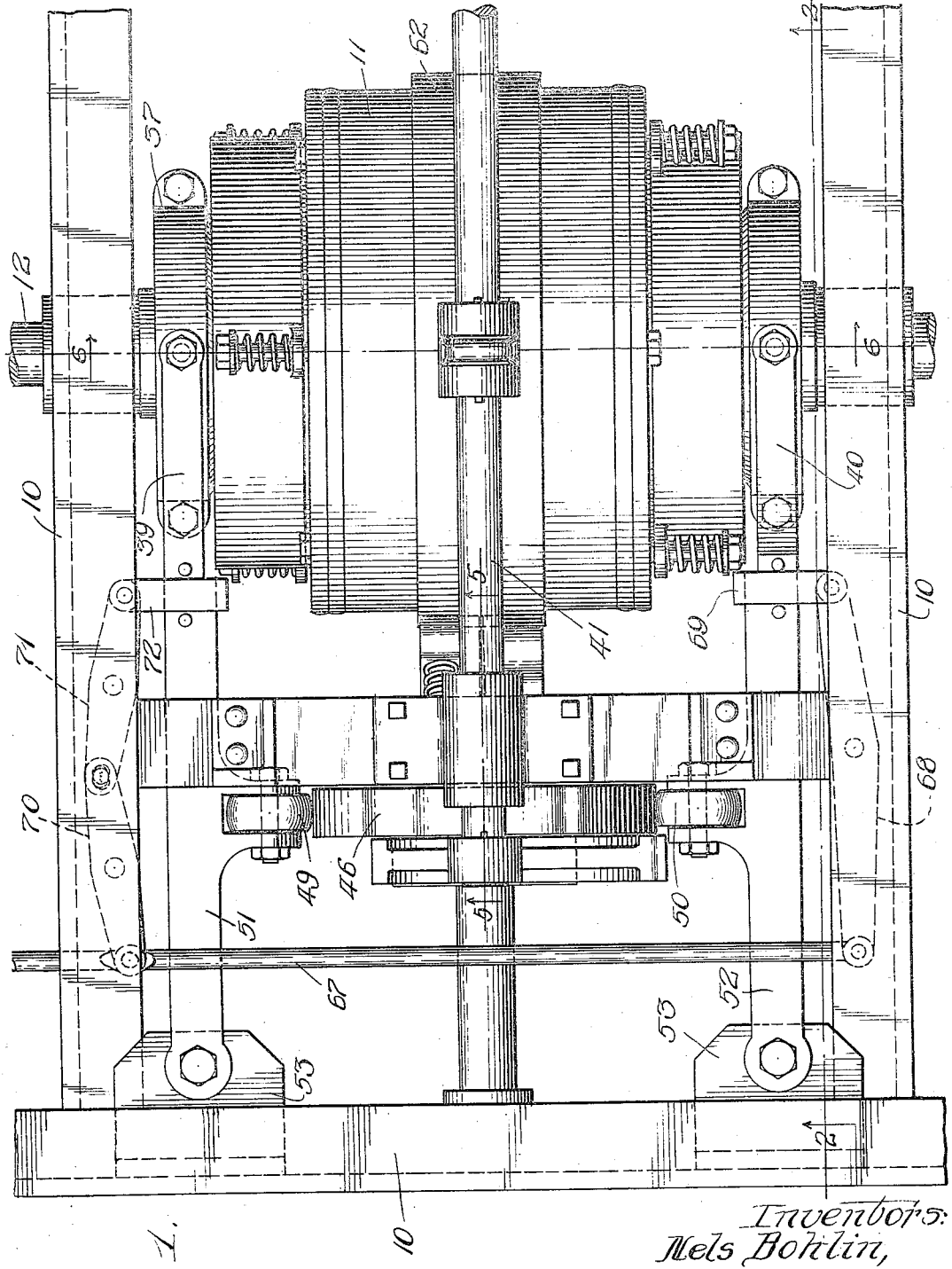

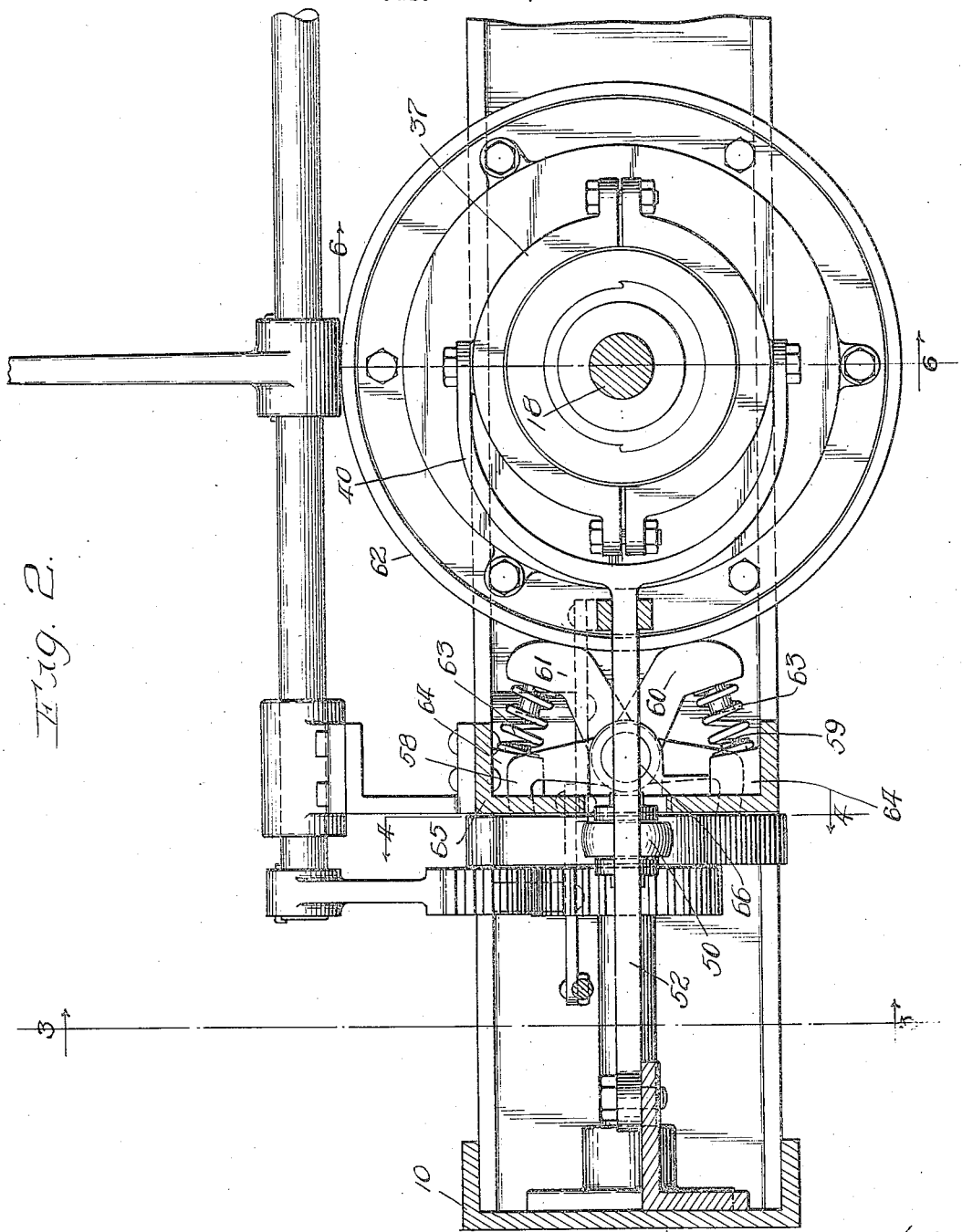

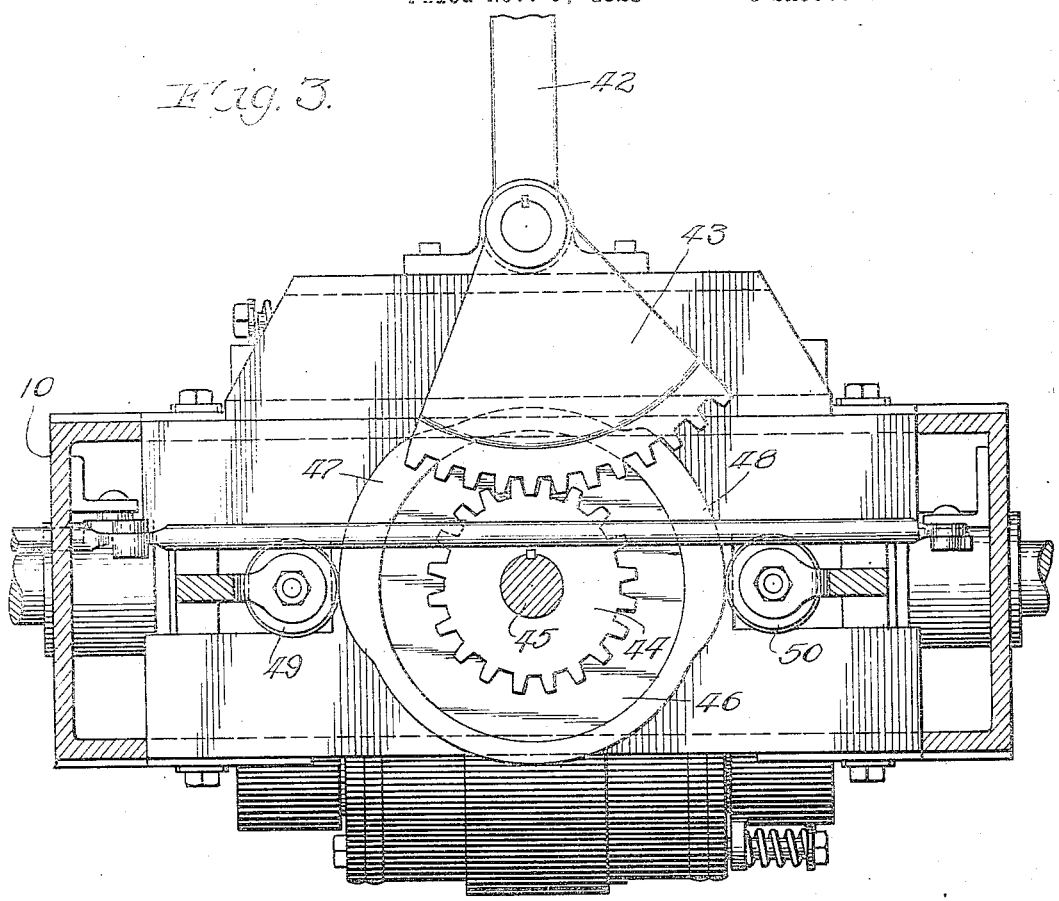
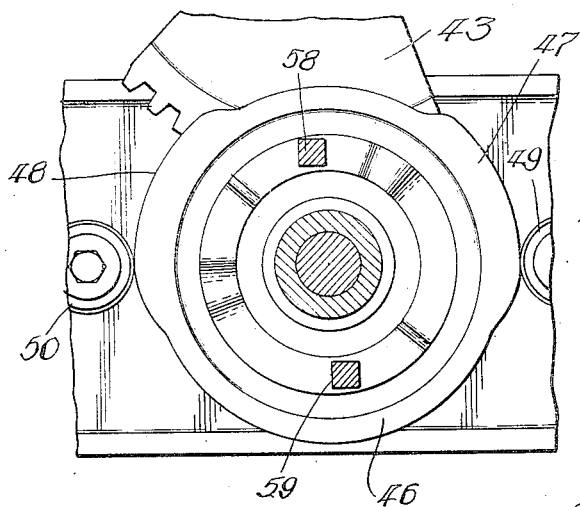
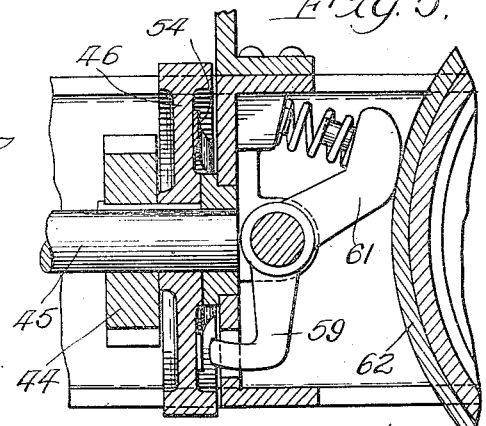

N. BOHLIN ET AL

TRANSMISSION GEARING FOR MOTOR VEHICLES

Filed Nov. 5, 1921

Inventors.
Nels Bohlin,
Sven Forner,
By Dyrenforth, Lee, Chritton & Wiles
Attys.

Patented Dec. 11, 1923.

1,477,208

UNITED STATES PATENT OFFICE.

NELS BOHLIN AND SVEN FORNER, OF CHICAGO, ILLINOIS.

TRANSMISSION GEARING FOR MOTOR VEHICLES.

Application filed November 5, 1921. Serial No. 513,091.

*To all whom it may concern:*

Be it known that we, NELS BOHLIN and SVEN FORNER, citizens of the United States, residing at Chicago, in the county of Cook and State of Illinois, have invented a new and useful Improvement in Transmission Gearing for Motor Vehicles, of which the following is a specification.

The present invention relates to transmission gearing for motor vehicles, and will be fully understood from the following description of an embodiment thereof, illustrated by the accompanying drawings, in which:

Figure 1 is a plan view of the transmission gear casing, together with its associated control devices;

Fig. 2 is a section on the line 2—2 of Fig. 1, viewed in the direction of the arrows and showing the transmission gear casing in end elevation;

Fig. 3 is a sectional view on the line 3—3 of Fig. 2, viewed in the direction of the arrows and showing the transmission gear casing in side elevation;

Fig. 4 is a sectional view on the line 4—4 of Fig. 2, viewed in the direction of the arrows, and showing the cam controlling the gearing in elevation;

Fig. 5 is a detailed sectional view on the line 5—5 of Fig. 1, viewed in the direction of the arrows;

Figure 6:
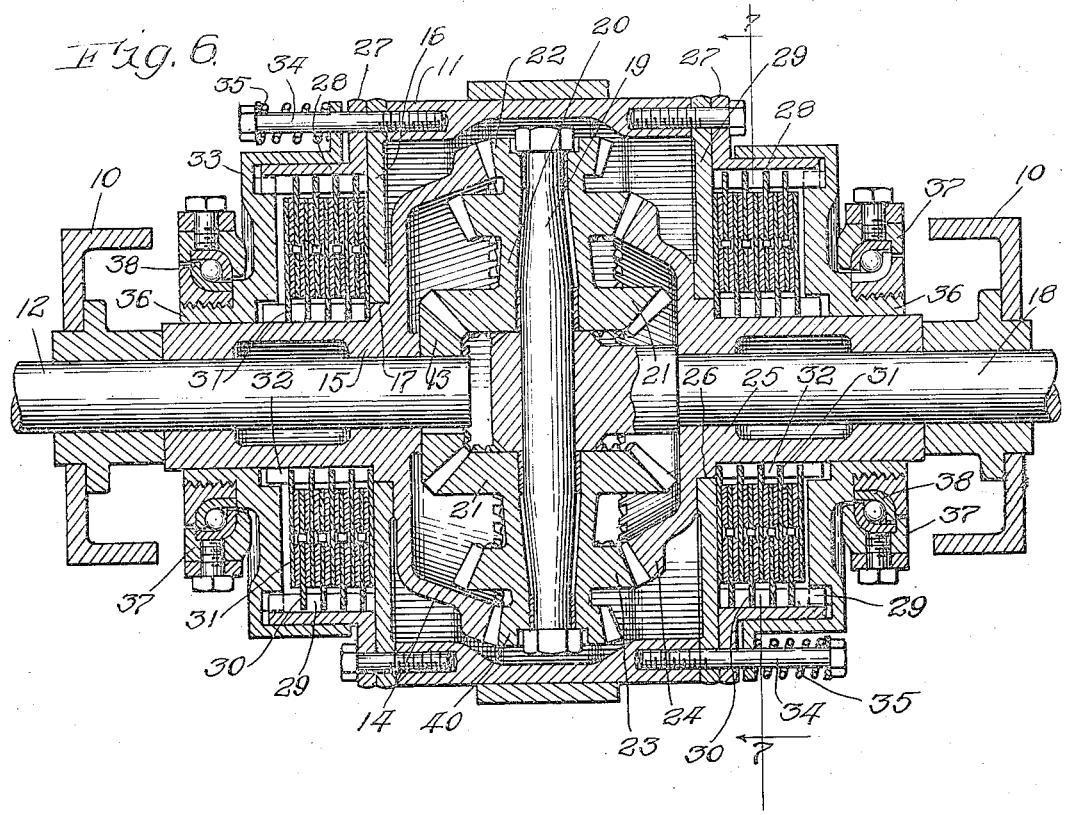
Figure 7:
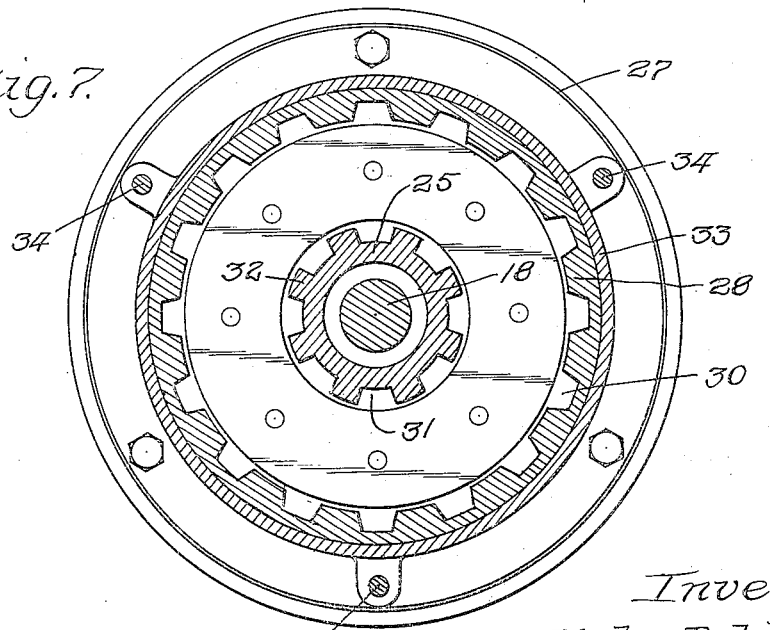

Fig. 6 is a sectional view through the transmission casing on the line 6—6 of Figs. 1 and 2; and Fig. 7 is a transverse sectional view through the end portion of the transmission gear casing on the line 7—7 of Fig. 6.

Referring more particularly to the drawings, the numeral 10 indicates a supporting frame, part of the chassis and of a vehicle upon which the transmission gear casing is mounted. Within the frame 10 the transmission gear casing 11 is mounted, this casing having a substantially cylindrical form in the embodiment of the invention illustrated. The motor shaft 12 enters the transmission casing and terminates in it, having keyed to its end a bevel gear 13. A second bevel gear 14 is mounted rotatably upon the shaft 12 and is provided with a hub or sleeve 15 which extends along the shaft 12 through an end wall 16 of the casing 11. This wall 16 of the casing has a rotatable bearing or engagement with the sleeve or hub 15 at a shoulder 17 formed on the latter.

The transmission shaft 18 enters the transmission gear casing 11 axially on the opposite side from the motor shaft 12 and to its end is fixed a short transverse shaft 19 which is provided at each end with a rotatable hub or sleeve 20. Upon each of these sleeves 20 is mounted or formed a bevel gear 21 meshing with the gear 13 on shafts 12, a bevel gear 22 meshing with the gear 14 and a bevel gear 23 meshing with a gear 24 mounted on a hub or sleeve 25 which, in turn, is rotatably mounted upon the transmission shafts 18 and is provided with a shoulder 26 which is rotatably engaged by the end plate 27 of the transmission casing 11.

Means are provided for preventing relative movement of the transmission casing 11 with respect to each of the hubs or sleeves 15 and 25 carrying the gears 14 and 24 respectively. To each end plate 16 and 27 of the casing 11 there is secured a ring 27ª provided with a cylindrical flange 28 upon which are mounted the ribs 29 which engage clutch plate 30. Opposing clutch plates 31 engage ribs 32 on the sleeves 15 and 25. A clutch cover or cap 33 passes over each of the circular flanges 28 enclosing the clutch plates, these caps being guided by the pins 34, upon which are mounted the coil springs 35 which tend to force the clutch plates into engagement with each other and thereby set the clutch. Each of the clutch covers or caps 33 is provided with a sleeve 36, which sleeves rotatably engage the gear sleeves or hubs 15 and 25 respectively. Rings 37 are rotatably secured to the clutch covers 33 around the sleeves 36, ball bearings 38, for example, being interposed. To the rings 37 surrounding the motor shaft 12 and the transmission shaft 18 respectively, are secured the clutch operating yokes 39 and 40 respectively.

Before proceeding with a description of the control mechanism shown in connection with the transmission gearing of the present invention, the operation of the latter will be described.

To place the gearing in neutral position, so that no movement is transmitted to the transmission shaft 18 from the motor shaft 12, the clutches at both ends of the casing 11 are released and the casing itself is held against rotation, by means hereinafter to be described. With both clutches released, the gears 14 and 24 are both freely rotatable. The motor shaft, through gears 13 and gears 21, causes the sleeves 20 to rotate and these in turn drive the freely movable gears 14 and 24. The sleeves 20 on the cross shaft 19 together with the gears 14 and 24 then act merely as idlers and no rotation of the cross shaft 19 is caused if the transmission shaft 18 is at rest. If the transmission shaft 18 is moving, as when the gearing is thrown into neutral during movement of the car, the shaft 19 may rotate freely within the casing irrespective of the rotation of the motor shaft.

For slow speed ahead the clutch engaging the end plate 27 of the transmission casing is set, that engaging the end plate 16 is released and the transmission casing itself is held against movement in the clockwise direction when viewed as in Figure 2. The gear 24 is then held in fixed position by the action of the clutch, and the gear 14 may rotate freely. The motor shaft 12 then, through gears 13, drives gear 21 and with it the sleeve 20 and the gears 23. The latter engage the gear 24, which under these conditions, is stationary, and in consequence, the shaft 22 is caused to rotate in the same direction as the motor shaft, carrying with it the transmission shaft.

For direct drive, the clutches at both ends of the transmission casing are set and the transmission casing is allowed to rotate freely. The transmission casing and gears 14 and 24 are then locked together and by reason of this fact, the cross shaft 19 with its gearing is locked in a fixed position relative to the gears 14 and 24. Rotation of the motor shaft under these conditions is transmitted directly to the transmission shaft.

For reverse movement the clutch engaging the plate 27 is released and that engaging the plate 16 of the transmission case is set, the transmission gear case itself being locked or held against anti-clock-wise movement, as viewed in Figure 2. The transmission case and with it the gear 14 are thereby held against rotation. Movement of the motor shaft 12, transmitted through gear 13 to gears 21 on the hub 20 on the cross shaft 19 cause the latter to rotate in the reverse direction to the rotation of the motor. In its rotation the cross shaft 19 carries with it the transmission shaft 18.

The operation of the transmission gearing is controlled as follows:

A shaft 41, operated by any suitable means such as lever 42, through segment 43, gear 44 and shaft 45, rotates a cam 46. Upon the periphery of this shaft are projecting portions 47 and 48. The periphery of the cam engages rollers 49 and 50 which are secured to the lever arms 51 and 52 respectively. These lever arms are pivoted in suitable bearings 53 mounted upon the supporting frame 10. The lever arm 51, through yoke 39, operates the clutch controlling the end plate 16 of the transmission gear casing, and the lever 52, through yoke 40, controls the clutch operating against the plate 27 of the transmission casing. The inner face of the cam 46 is provided with a cam surface 54 having projections 55, 56 and 57 which control the operation of the means provided for frictionally engaging the surface of the transmission casing. The ends 58 and 59 of two oppositely disposed levers 60 and 61 mounted on a common pivot shaft 66 protrude through openings in the brace 65 upon which they are mounted and engage the projections just referred to. The heads of the levers 60 and 61 frictionally engage a friction band 62 on the periphery of the transmission gear casing, the engagement of the head of the lever 60 with the band 62 being most effective to prevent rotation of the transmission gear casing in the clockwise direction (Fig. 2), and the engagement of the lever 61 being most effective to prevent its rotation in the opposite direction. The head of the levers 60 and 61 are forced by springs 63 interposed between them and blocks 64 mounted on the supporting cross brake 65 against the friction band on the transmission gear casing. The engagement of the ends 58 and 59 of the levers 60 and 61 respectively with the raised cam portions 55, 56 and 57 on the inner face of cam 47 causes the lever affected to be withdrawn from engagement with the friction band on the gear casing.

The operation of the transmission gearing from the control lever 42 will now be readily apparent. In the position shown in Figs. 2, 3 and 4 of the drawing, the transmission gearing is in neutral. It will be seen that in this position the elevated peripheral portions 47 and 48 of the cam 46 engage the rollers 49 and 50 controlling the clutch operating levers 51 and 52. These levers are forced outwardly in this position of the control lever, and the clutches at both ends of the transmission gear casing are consequently released. At the same time, the ends 58 and 59 of the levers 60 and 61 engage depressed portions of the cam surface 54 on the inner face of the cam member 46, permitting the heads of levers 60 and 61 to engage the friction band 62 on the transmission gear casing, thereby preventing its rotation. As previously explained, with both clutches released and the transmission gear casing held against rotation, the gearing is in neutral.

For slow speed ahead, the lever 42, as viewed in Fig. 3, is moved to the right, the gear sector 43 being moved a portion of its length to the left. This causes a clockwise rotation of the cam 46, when viewed as in Fig. 3, bringing the cam into such position that the roller 49 passes off of the elevated portion 47 whereas the roller 50 remains upon the elevated cam portion 48. As a result of the movement of roller 49, the lever 51 is permitted to move inward, and the clutch engaging the face 16 of the transmission gear casing with the hub of the gear 14 is set, the opposite clutch being held released. At the same time, the end 59 of lever 61 rises upon the elevated portion 56 and cam 54, the end 58 of lever 60 remaining depressed. The lever 60 is then in engagement with the transmission gear casing, preventing its rotation in the clockwise direction, as viewed in Fig. 2. The device is now in position for slow speed ahead, as previously explained.

On further movement of the lever 42 to the right, as viewed in Fig. 3, the roller 50 rides off the elevated portion 58, both rollers 49 and 50 now being in such position that the clutch levers 51 and 52 respectively permit the clutches on both faces of the transmission gear casing to set. At the same time, the arms 58 and 59 of both levers 60 and 61 rise upon elevated portions 57 of the cam surface 54, thereby removing the levers 60 and 61 from engagement with the transmission gear casing. The rotation of the latter is then permitted. In this position, direct drive is secured.

For reverse drive, the lever 42 is moved from the neutral position to the left, as viewed in Fig. 3. The roller 49 then remains upon the elevated cam portion 47, and the roller 50 engages a depressed portion. The lever 52 controlled by roller 50 then permits the clutch engaging the face 27 of the transmission gear casing to set. At the same time, the end 58 of lever 60 rides up on the elevated portions 55 of the cam surface 54, the end 59 of the lever 61 remaining in a depressed portion. The lever 60 is consequently raised out of engagement with the transmission gear casing, the lever 61 remaining in engagement therewith, and presenting anticlockwise rotation, as viewed in Fig. 2. In this position reverse drive is secured, as previously explained.

It is to be noted that the position of parts in Fig. 4 is the reverse of that in Fig. 3.

Both clutch members may be controlled independently of the gear setting lever by means of any suitable lever (not shown), through the control rod 67. From one point on this rod through lever 68, and yoke 69, the clutch control lever 52 may be controlled. From another point on the rod 67 through the pair of levers 70 and 71 and the yoke 72, the other clutch control lever 51 may be controlled. The clutch operating rod 67 may be controlled independently of the gear setting lever or may be employed in conjunction therewith in the same manner as a clutch is employed in conjunction with ordinary means of setting transmission gears.

Although the present invention has been described in connection with the details of a specific embodiment thereof, it is not intended that these shall be regarded as limitations thereupon except in so far as included in the accompanying claims.

We claim:

1. In transmision gearing, a motor shaft, a gear fixed thereto, a second gear rotatably journalled on said shaft, a cross shaft, gears mounted thereon and engaging the gears mounted on the motor shaft, a transmission shaft secured to the cross shaft, a gear rotatably journalled on the transmisson shaft and engaging the gears mounted on the cross shaft, a casing surrounding the gearing, and means for independently or simultaneously preventing rotation of said gears journalled on the motor and transmission shafts relative to the casing.

2. In transmision gearing, a motor shaft, a gear fixed thereto, a second gear rotatably journalled on said shaft, a cross shaft, gears mounted thereon and engaging the gears mounted on the motor shaft, a transmission shaft secured to the cross shaft, a gear rotatably journalled on the transmission shaft and engaging the gears mounted on the cross shaft, a freely rotatable casing surrounding said gears, means for preventing rotation of said casing, and means for engaging said casing with the gears journalled on the motor and transmision shafts.

3. In transmission gearing, a motor shaft, a transmission shaft axially aligned therewith, a gear fixed to the end of the motor shaft, a cross shaft fixed to the end of the transmission shaft, gears rotatably mounted on the cross shaft and meshing with said gear on the motor shaft, gears rotatably journalled on the motor shaft and on the transmission shaft and meshing with the gears on the cross shaft, a cylindrical casing for the gearing, independently releasable clutch means between said casing and the last mentioned rotatably mounted gears, and means for preventing rotation of the casing.

4. In transmission gearing, a motor shaft, a transmission shaft axially aligned therewith, a gear fixed to the end of the motor shaft, a cross shaft fixed to the end of the transmission shaft, gears rotatably mounted on the cross shaft and meshing with said gear on the motor shaft, gears rotatably journalled on the motor shaft and on the transmission shaft and meshing with the gears on the cross shaft, a cylindrical casing for the gearing, independently releasable clutch means between said casing and the last mentioned rotatably mounted gears, a friction band surrounding the casing and means for frictionally engaging said band to prevent rotation of the casing.

NELS BOHLIN.
SVEN FORNER.